C. W. IGO.
SAFETY VALVE STEM.
APPLICATION FILED FEB. 21, 1914.
1,259,745.
Patented Mar. 19, 1918.
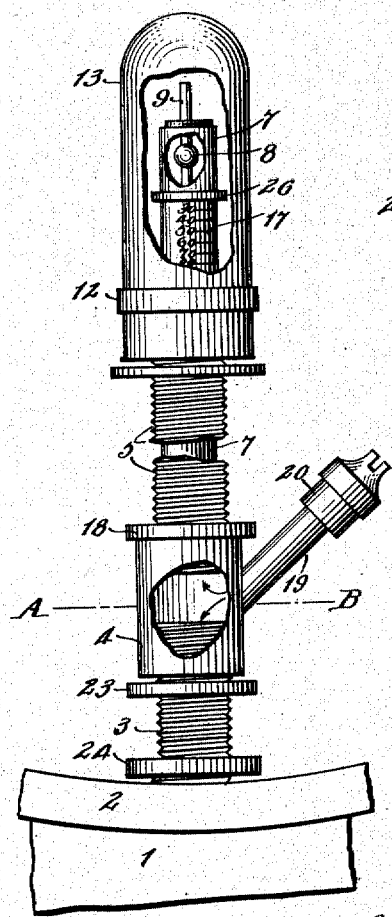
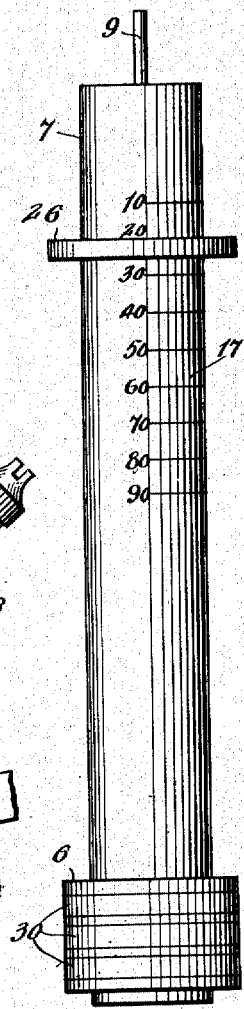
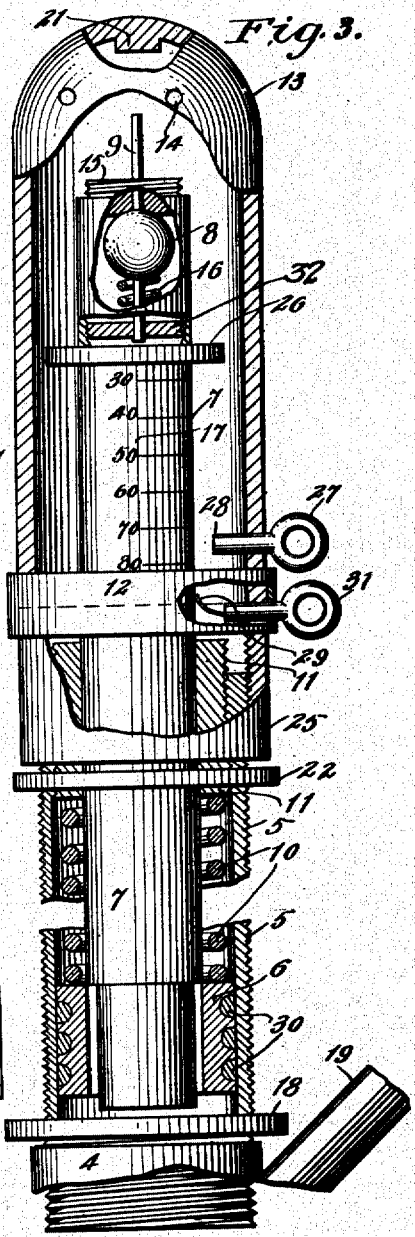
Witnesses:
J. E. Norton
C. L. Barnes
Charles W. Igo, Inventor:
John F. Mullaney,
Attorney.

UNITED STATES PATENT OFFICE.

CHARLES W. IGO, OF COLORADO SPRINGS, COLORADO.

SAFETY-VALVE STEM.

1,259,745.  Specification of Letters Patent.  Patented Mar. 19, 1918.

Application filed February 21, 1914.  Serial No. 820,118.

*To all whom it may concern:*

Be it known that I, CHARLES W. IGO, a citizen of the United States, residing at 831 East Boulder street, in the city of Colorado Springs, county of El Paso, and State of Colorado, have invented a new and useful Safety-Valve Stem, of which the following is a specification.

My invention relates to improvements in valve stems and safety valves and annunciators in one combination for pneumatic appliances, and more especially applicable to use on pneumatic tires for vehicles; and the objects of my improvements are to provide means for designating the pressure of air within the pneumatic appliance at any time, to provide a safety valve to release the compressed air when an excessive or undesired pressure occurs from any cause, and to provide an electric annunciator to designate an excessive or undesired low pressure within the tire or other pneumatic appliance on some convenient view point to the operator.

I attain these objects by the mechanism illustrated in the accompanying drawing.

Figure 1. is a side elevation of the safety valve mounted upon the valve stem of a pneumatic tire for automobiles.

Fig. 2. is a detail on an exaggerated scale of a side elevation of the piston and the graduated scale of the safety valve.

Fig. 3. is a detail on an exaggerated scale of a side elevation of part of the safety valve above the line A B on Fig. 1, with parts removed to disclose the parts beneath, and segregated to shorten the figures.

Similar letters and figures refer to similar parts throughout the several views.

The piston 6, operated by air pressure from the pneumatic tire 1, the cylinder 5, the piston 6, carrying the safety valve 8, and having a graduated scale 17, the glass casing 13, containing the contacts 26, and 27, and the intake valve stem 19, constitute the principal parts of my invention.

The illustration in the accompanying drawings shows my invention attached by threaded connection to the valve stem 3, of the pneumatic tire by means of a metal connecting thimble 4, carrying integral therewith the intake valve stem 19, provided with the casing or cap 20, carrying a common intake valve as for instance the Schrader valve. Mounted by threaded connection with the said metal connecting thimble 4, is the metal cylinder 5, in which is operated the pneumatic piston 6, mounted upon the hollow piston rod 7, which is forced inward toward the pneumatic tire by means of the expansion of the coil spring 10, working against the threaded compression nut 11, within the cylinder 5. The piston 6, is forced outwardly against the spring 10, by the pressure of the air within the pneumatic tire 1. The outer end of the hollow piston rod 7, carries a safety valve 8, having a plunger pin 9, projecting from the end of the piston rod 7, and adapted to engage the bumper 21, on the inside of the top end of the glass casing 13, covering the valve 8, and the graduated scale 17, of the hollow piston rod 7.

In the operation of this appliance the valve stem 3, of a common automobile tire is stripped of its valve and upon it is placed the lock nut 24, to prevent the valve stem 3, from chafing on the rim 2, of the wheel. Then the lock nut 23, is also placed upon the valve stem 3, by threaded connection and is used to hold the metal thimble 4, from torsional movement upon the valve stem 3. The metal thimble 4, is then screwed down upon the valve stem 3, and carries with it in adjustable threaded connection the other parts of my appliance. The air is forced into the tire 1, through the intake valve stem 19, and as the pressure increases the air will force the pneumatic piston 6, outward against the coil spring 10, which will yield to the pressure allowing the hollow piston rod 7, to be forced upwardly and outwardly from the base of the valve stem 3, exposing the graduated scale of said piston rod 7, so that it may be seen through the glass casing 13, above the metal band 12, which secures said glass casing to the adjustable thimble 25. As the pressure increases from any cause the said piston rod 7, will be forced outward and upward carrying with it at its outer end the safety valve 8, rigidly secured to the plunger pin 9, projecting beyond said piston rod until the end of the plunger pin 9, is carried against the bumper 21, on the inside of the outer end of the glass casing 13, when a continuation of the pressure will carry the piston 6, so as to force the valve seat 15, away from the valve 8, thus releasing the confined air from the tire 1, through the valve stem 3, and up through the hollow piston rod 7, and out into the cavity of the glass casing 13, and out through the air holes 14, 14, of the glass casing 13, until the pressure has been sufficiently reduced within the pneumatic tire 1, to allow the coil spring 10, to overcome the pneumatic pressure sufficiently to remove the plunger pin 9, from contact with the bumper 21, when the coil valve spring 16, will again force the safety valve 8, against the valve seat 15, thus shutting off the escape of the compressed air from the hollow piston rod 7.

This graduated scale 17, is useful while inflating the tire to indicate the pressure obtained and to assist in getting the desired pressure. The scale here shown in Fig. 2, is marked for a pressure of from 10 pounds to 110 pounds and is indicated by the figures being disclosed above the metal band 12, and can be seen through the glass casing 13. The safety valve is useful also among other emergencies in preventing the bursting of a tire from any excessive acquired pressure and especially from over-inflation, from over-heating while standing in the sun or over-heating when running the tire for a long time at a high speed, as in road racing, in each of which cases the pressure would carry the plunger 9, against the bumper 21, and relieve the excessive pressure by letting out some of the air so as to save the bursting of the tire. Another feature of the safety valve is in providing a safeguard from rim cutting wherein the tire might become excessively deflated, allowing the pressure to go down to 30 pounds or 20 pounds which would allow the circular contact ring 26, encircling, in adjustable connection, the hollow piston rod 7, to come down into contact with the contact end 28, of the electrode 27, held in insulated connection in the side of the glass casing 13, and thus making a short circuit with a battery and an annunciator mounted upon the dash or other prominent part of the automobile in plain view of the operator, warning him of the deflated condition. 24, is a lock nut securing the valve stem 3, on the wheel rim 2, and 22, is a lock nut provided to prevent torsional action between the cylinder 5, and the adjusting thimble 25. 23, is a lock nut provided to prevent torsional action between the valve stem 3, and the thimble 4. 18, is a lock nut provided to prevent torsional action between the cylinder 5, and the thimble 4. The pressure of the coil spring 10, is regulated by means of the adjustment by screw connection of the compression nut 11, upon the inside of the cylinder 5, while the pressure of the valve spring 16, is adjusted by means of the valve seat 15, being moved by the adjustable threaded connection with the inside of the hollow piston rod 7. The lower end or the inner end of the plunger pin 9, works loosely in a guide hole in the spring seat 32, on the inside of the hollow valve piston rod 7, To adjust the graduated scale 17, the glass casing 13, is adjusted upon the cylinder 5, by means of threaded connection with the inside of the adjusting thimble 25, and secured from change by means of the lock nut 22.

To secure an air tight contact between the piston 6, and the inside of the cylinder 5, the piston is provided with gaskets 30, 30, as shown in Fig. 2, and Fig. 3.

The contact 31, is provided at its contact end with thin spring contact 29 connecting with yielding contact with the outside of the hollow piston rod 7.

Claims:

1. In a pneumatic valve structure of the class described, for the receptacles of pneumatic appliances, a thimble in threaded connection with the valve stem of the appliance said valve stem having the valve removed, a valve stem and intake valve laterally extending from the side of said thimble, a cylinder in threaded connection with said thimble, a pneumatic piston in said cylinder having a hollow piston rod integral therewith extending beyond said cylinder and having graduated pressure numbers marked thereon to indicate the pneumatic pressure within the appliance, a glass extension to said cylinder secured thereto adjustably by threaded connection, a pressure valve in the end of said hollow piston rod having a plunger rod extending beyond the end of the hollow piston rod and integral with said pressure valve, a bumper in said glass extension adapted to engage said plunger rod to release said pressure valve when said hollow piston rod is forced outwardly by the pneumatic pressure within the appliance, substantially as set forth and for the purposes specified.

2. A combined pneumatic safety tire valve, pressure indicator and electric annunciator, comprising a thimble in threaded connection with the valve stem of a pneumatic tire with the valve removed, a pneumatic cylinder in threaded connection with said thimble, an intake valve and stem extending integral and laterally with said thimble, a pneumatic piston within said cylinder adapted to be forced from the appliance by the pneumatic pressure within and having a pressure spring to force it against the pneumatic pressure with adjustable force, a hollow piston rod extending through and integral with said piston, a tubular glass extension connected adjustably by threaded contact to said cylinder and carrying two electric contacts on its side and a bumper at its end, a pressure check valve in the end of the hollow piston rod adapted to prevent the air from escaping through the rod, a plunger pin integral with the check valve and extending beyond the end of the piston rod and registering so as to engage said bumper and adapted to release said check valve and the air within the appliance, a pressure spring adapted to close said check valve when the pressure from said bumper is removed, a sliding electric contact between one of the insulated electric contacts and the side of the said hollow piston rod, an electric contact nearer the end of the hollow piston rod registering to come into contact with the other insulated electric contact when the pneumatic pressure is removed to a certain pressure and adapted to form a short circuit in connection with an annunciator, all substantially as set forth and for the purposes specified.

3. In a valve structure of the class described, the combination of a valve stem of a pneumatic appliance with the valve removed therefrom, a tubular member connected therewith by threaded connection and having an intake valve connected laterally thereto adapted to supply air to the appliance, a cylinder connected adjustably to said tubular member, a pneumatic piston working within said cylinder and forced from said valve stem and said appliance by pneumatic pressure and having a coil pressure spring adjustably secured near the outer end of said cylinder on the inside thereof adapted to force said piston toward said valve stem and said appliance, a hollow piston rod extending through said piston and integral therewith and adapted to release air from said cylinder, a check valve in the outer end of said piston rod adapted to prevent the air from escaping while closed and having a plunger pin integral therewith protruding beyond the end of said hollow piston rod and adapted to be forced against a bumper by the pneumatic pressure on said piston and to release said check valve thereby, a tubular glass case extension of said cylinder secured to said cylinder by adjustable threaded connection and having a bumper in its end registering with said plunger and adapted to to force it back within said hollow piston rod, a coil spring adapted to hold said check valve in position against its valve seat while not opened by said plunger pin, graduated scale numbers on said hollow piston rod adapted to indicate the air pressure within the cylinder and within the appliance, two electrical connections in the side of said glass case adapted to connect to two electric contacts on the inside with said hollow piston rod and on the outside of the glass case to connect with an electrically operated annunciator on some desirable fixture, one of said connections having a pliable electric contact slidably connected with the side of said hollow piston rod and said piston rod having a projecting metal electric contact near its end adapted to engage the other of the said two electrical connections while the pressure from within the appliance is reduced below normal and to thus cause a short circuit of the electrical current adapted to operate said annunciator, all in combination with a pneumatic tire or pneumatic appliance, substantially as set forth and for the purposes specified.

4. In a safety valve for pneumatic appliances, the combination with a pneumatic tire or other pneumatic appliance, of a valve stem having a longitudinal extension and a side intake valve between the extension and the pneumatic appliance, said extension comprising a cylinder, a pneumatic piston carrying a graduated hollow piston rod, a release valve plunger at the end of said hollow piston rod and means for opening said plunger when a certain pressure is attained, a glass housing having orifices and covering the end of said hollow piston rod, an electric terminal in said housing and an electric contact on said hollow piston rod adapted to engage said terminal on its side toward the end of said piston rod, all substantially set forth and for the purpose specified.

CHARLES W. IGO.

Witnesses:
MARGARET M. PLATT,
R. B. VAN WINKLE.